United States Patent Office 3,119,879
Patented Jan. 28, 1964

3,119,879
HYDROGENATION OF 1,4-BUTYNEDIOL TO
1,4-BUTENEDIOL
Eugene V. Hort and David E. Graham, Westfield, N.J.,
assignors to General Aniline & Film Corporation, New
York, N.Y., a corporation of Delaware
No Drawing. Filed May 27, 1960, Ser. No. 32,119
4 Claims. (Cl. 260—635)

This invention relates to an improved process of catalytic hydrogenation of 1,4-butynediol, hereinafter referred to as butynediol, to 1,4-butenediol, hereinafter referred to as butenediol.

The hydrogenation of butynediol to butanediol in the presence of a number of different catalysts and by a number of different procedures is well known. For many industrial applications, it is desirable that the hydrogenation of butynediol be stopped at the butenediol stage. In connection with the latter, it has been reported in the literature that some organic amines will retard the hydrogenation of butenediol to butanediol more than they retard the hydrogenation of butynediol to butenediol. For example, Fukada and Kusama, Bull. Chem. Soc. Japan 31, 339–42 (1958); C.A. 52, 18199d (1958), describe the stepwise hydrogenation of butynediol to butenediol to butanediol with a palladium on calcium carbonate catalyst. These investigators state that quinoline but not pyridine or piperidine retards the first step. Pyridine retards the second step, piperidine more so, and quinoline almost completely. Of these three amines, only quinoline would spontaneously stop short of complete hydrogenation.

Freĭdlin et al., Doklady Akad. Nauk S.S.S.R. 124, 598–601 (1959); C.A. 53, 11206e (1959), describe similar hydrogenations with a nickel catalyst. They report that pyridine slows the second step but does not stop it. Piperidine and quinoline were each reported to stop the hydrogenation at the butenediol stage.

While according to Freĭdlin et al., quinoline stops the hydrogenation of butynediol at the butenediol stage, this amine boils at nearly the same temperature as butenediol, and accordingly its separation by distillation is exceedingly difficult. Piperidine and pyridine boiling at a much lower temperature than butenediol have the advantage over quinoline since separation by distillation is feasible. However, in such case, comparatively large amounts of these heterocyclic amines must be used in order to suppress the second hydrogenation as will be pointed out hereinafter.

It is the principal object of this invention to provide an improved process for the reduction of butynediol to butenediol without resorting to expensive heterocyclic amines in large quantities.

Another object is to provide a process for the hydrogenation of butynediol to butenediol in the presence of a nickel catalyst at relatively low temperatures and pressures without detriment to the yields of the desired product.

Other objects and advantages will become more clearly manifest from the following description:

We have found that the hydrogenation of butynediol can be stopped spontaneously at the butenediol stage while employing a nickel catalyst such as Raney-type nickel catalyst or a nickel catalyst modified with copper in the presence of small amounts of ammonia ranging from about 0.05 to 0.30 mole per mole of butynediol. The ammonia is very inexpensive and does not contaminate the final product, i.e. butenediol. The hydrogenation is conducted at temperatures of about 25–100° C. and pressures from atmospheric to about 300 p.s.i.g.

In accordance with the process of the present invention, 1,4-butynediol in a suitable non-reactive solvent such as for example methyl, ethyl or propyl alcohol, dimethyl ether of ethylene glycol and the like or an aqueous solution of 1,4-butynediol containing an economic range of from 20 to 50% of 1,4-butynediol is successfully reduced to high yields of butenediol. The aqueous solutions of 1,4-butynediol are available commercially at a pH of about 2.5 to 6.

The nickel catalyst employed in the process is preferably maintained in the aqueous butynediol reaction medium in finely divided form. A Raney-type nickel catalyst, prepared according to U.S. Patent 1,638,190, may be employed or in lieu thereof, a nickel catalyst system containing dispersed thereon copper deposited from a soluble or dispersible copper compound. The amount of copper is not critical and may range from 0 to 50%. For example, when an aqueous solution of butynediol is to be hydrogenated, a water-soluble copper compound is added thereto, preferably copper salts of strong acids such as copper sulfate, copper chloride, copper nitrate or the copper salts of weak acids such as copper cyanate, copper formate, copper acetate or copper carbonate. Copper oxide may also be employed. The nickel replaces the copper from solution and any residual unreduced copper is reduced during the hydrogenation. The precipitated copper is dispersed or coated on the nickel catalyst. One such catalyst is described in U.S. Patent 2,892,801, the teachings of which are incorporated by reference thereto. The amount of nickel catalyst, i.e. nickel alone or nickel modified with copper, will generally range from about 0.1 to 10% and preferably from 0.5 to 3% by weight of the butynediol.

The amount of catalyst employed is not critical since the catalyst is not deactivated during the hydrogenation and may be reused. For a given amount of butynediol to be hydrogenated to butenediol the rate of hydrogenation will vary directly with the amount of catalyst employed.

The following examples will describe in greater detail the exact procedure of hydrogenating butenediol with a nickel catalyst in the presence of ammonia to yield high yield of butenediol.

EXAMPLE I

Into a 1 gallon stainless steel hydrogenator were charged 1442 grams of technical grade 35.8% aqueous butynediol solution, 51.9 grams of 26° Baumé ammonia solution, and 30 grams of nickel-copper catalyst (10% of copper by weight of the nickel catalyst). Hydrogenation was conducted at 50° C. and 300 p.s.i.g. The hydrogen pressure was continued until hydrogen absorption ceased. The reaction mixture was filtered and the filtrate distilled at reduced pressure. An 83% yield of 1,4-butenediol was obtained. The material, without fractional distillation, had a freezing point of 4.0° C., a refractive index of 1.4741 and contained 90.5% of butenediol.

To demonstrate that the presence of ammonia during the hydrogenation reaction is not a function of alkalinity, the following experiment was conducted:

EXAMPLE II

Example I was repeated with the exception that the ammonia solution was replaced by an equivalent amount of aqueous sodium hydroxide. Approximately twice as much hydrogen was absorbed before the hydrogenation stopped spontaneously. The distilled product, obtained in an 88% yield, was butanediol with a freezing point of 18.3° C. and a refractive index of 1.4449. The same results were obtained with potassium hydroxide. These examples clearly demonstrate that the successful results with ammonia are not a function of the basicity per se but are specific for ammonia.

EXAMPLE III

Example I was repeated with the exception that the nickel-copper catalyst was replaced by an equivalent amount of Raney-nickel catalyst. The hydrogenation stopped spontaneously at the butenediol stage. Upon distillation, 82% of crude butenediol freezing at −0.7° C., with a refractive index of 1.4730, and a butenediol content of 89% was obtained.

EXAMPLE IV

Example I was again repeated with the exception that the hydrogenation temperature was 40° C. and the hydrogenation pressure was 75 p.s.i.g. Upon distillation 86% of butenediol freezing at 3.9° C. with a refractive index of 1.4725 and an assay of 89% butenediol was obtained.

As previously noted, piperidine and pyridine boil much lower than butenediol, and in view thereof, it was felt that separation by distillation is feasible. To determine the results by the use of these amines, five additional experiments were conducted, the results of which are tabulated in the following table:

Table

| Experiment | Amine | Moles of Amine per Mole of Butynediol | Catalyst | Hydrogenation Conditions, Temp./Pressure | Hydrogen Consumed, Percent of Theory for Butenediol |
|---|---|---|---|---|---|
| 1 | Piperidine | 0.1 | A | 40° C./75 p.s.i.g | 200 |
| 2 | Pyridine | 0.05 | B | 40° C./45 p.s.i.g | 175 |
| 3 | ---do--- | 0.25 | B | 40° C./45 p.s.i.g | 135 |
| 4 | ---do--- | 0.50 | B | 40° C./45 p.s.i.g | 128 |
| 5* | ---do--- | 0.50 | A | 40° C./75 p.s.i.g | 107 |

A = 17% copper on nickel.
B = 7% copper on nickel.
*Distillation of product of Experiment 5 gave 86.3% of crude butenediol having a freezing point of 5.3° C. and a refractive index at 25° C. of 1.4755.

From the foregoing table it will be noted that comparatively large amounts of piperidine and pyridine are required to suppress the second hydrogenation. This is particularly evident when one considers the weights rather than moles since piperidine and pyridine have approximately five times the molecular weight of ammonia, and furthermore these amines also boil higher than ammonia making their separation from butenediol by distillation more difficult. It, therefore, becomes manifest from the above that ammonia is far superior and much cheaper in commercial operations in the conversion of butynediol to butenediol.

We claim:

1. The process of preparing 1,4-butenediol which consists essentially of catalytically hydrogenating aqueous 1,4-butynediol in the presence of 0.05 to 0.30 mole of ammonia per mole of 1,4-butynediol and in the presence of a catalyst selected from the class consisting of Raney nickel and Raney nickel containing not more than 50% of copper, by the addition of hydrogen at a pressure of from atmospheric to 300 p.s.i.g.

2. The process of preparing 1,4-butenediol which consists essentially of catalytically hydrogenating aqueous 1,4-butynediol of 20–50% concentration in the presence of 0.05 to 0.30 mole of ammonia per mole of 1,4-butynediol at a temperature of 25–100° C. in the presence of a catalyst selected from the class consisting of Raney nickel and Raney nickel containing not more than 50% of copper, by the addition of hydrogen at a pressure of from atmospheric to 300 p.s.i.g.

3. The process of preparing 1,4-butenediol which consists essentially of catalytically hydrogenating 1,4-butynediol in the presence of 0.05 to 0.30 mole of ammonia per mole of 1,4-butynediol at a temperature of 25–100° C. and a pressure of from atmospheric to 300 p.s.i.g. and in the presence of a catalyst selected from the class consisting of Raney nickel and Raney nickel containing not more than 50% of copper, by the addition of hydrogen at said pressure.

4. The process according to claim 3 wherein the moles of ammonia are 0.10 to 0.20 mole per mole of 1,4-butynediol.

References Cited in the file of this patent

UNITED STATES PATENTS

| 2,157,365 | Vaughn | May 9, 1939 |
| 2,267,749 | Reppe et al. | Dec. 30, 1941 |

FOREIGN PATENTS

| 508,944 | Great Britain | June 26, 1939 |